United States Patent [19]

McMahon et al.

[11] Patent Number: 4,524,693

[45] Date of Patent: Jun. 25, 1985

[54] UNDERWATER TRANSDUCER WITH DEPTH COMPENSATION

[75] Inventors: Garfield W. McMahon; Bruce A. Armstrong, both of Dartmouth, Canada

[73] Assignee: Her Majesty the Queen in right of Canada, as represented by Minister of National Defence of Her Majesty's Canadian Government, Ottawa, Canada

[21] Appl. No.: 545,867

[22] Filed: Oct. 27, 1983

Related U.S. Application Data

[63] Continuation-in-part of Ser. No. 392,470, Jun. 28, 1982, abandoned.

[30] Foreign Application Priority Data

Dec. 22, 1981 [CA] Canada .................................. 392962

[51] Int. Cl.[3] ............................................ H04B 17/00

[52] U.S. Cl. .................................... 367/167; 367/163; 367/172; 367/174

[58] Field of Search ............... 367/140, 141, 153, 155, 367/157, 163, 159, 166, 167, 171, 172, 174, 175; 310/337

[56] References Cited

U.S. PATENT DOCUMENTS

| | | | |
|---|---|---|---|
| 2,490,595 | 12/1949 | Merten | 367/171 X |
| 3,139,603 | 6/1964 | Church et al. | 367/155 X |
| 3,624,429 | 11/1971 | Behrendt | 367/159 |
| 3,992,693 | 11/1976 | Martin et al. | 367/166 X |
| 4,409,681 | 10/1983 | White | 367/159 |

*Primary Examiner*—Harold J. Tudor
*Attorney, Agent, or Firm*—Stevens, Davis, Miller & Mosher

[57] ABSTRACT

An underwater transducer in which a ring of piezoelectric ceramic elements vibrates radially in response to an applied voltage. Spacer elements formed of steel are placed between pairs of ceramic elements and used to couple the ring movement to convex diaphragms. Each diaphragm is formed with radially extending fingers, which attach to the spacer elements. A water bladder assembly within the transducer forms a passive internal pressure compensation system. Preferably, the water bladder assembly is attached to the ring in a manner that mechanically decouples the bladder assembly from the ring.

15 Claims, 8 Drawing Figures

UNDERWATER TRANSDUCER WITH DEPTH COMPENSATION

This application is a continuation-in-part of application Ser. No. 392,470 filed June 28, 1982 now abandoned.

The present invention relates to underwater transducers and, in particular, to an underwater transducer of rugged construction, which gives improved coupling of energy from the ceramic elements to the diaphragms, and also provides depth compensation over a range of operating depths, and an extended maximum operating depth.

It is known to provide underwater transducers that have a driving ring or collar of electrostrictive material with flexible diaphragms that cover the top and bottom of the driving ring. As the ring vibrates radially, the vibration is communicated in amplified form to the diaphragms and then coupled directly to the water.

The present invention provides an improved form of such a transducer in that the coupling between the driving ring and the diaphragms is such as not to impose high stresses on the ceramic elements. Further, the coupling is such as to transfer energy more efficiently from the driving ring to the diaphragms. The transducer also provides a passive internal pressure compensation system, which gives improved depth capability.

One embodiment of the invention consists of a sealed underwater transducer comprising: a plurality of electrostrictive elements and spacer elements arranged to form a driving ring; the elements have opposed surfaces axially of the ring, and the ring surrounds a space radially internally of the same; and the driving ring is expandable radially in response to an applied voltage.

A pair of flexible diaphragms closes off said space axially of the ring, and the diaphragms are each formed with a plurality of extensions extending radially outwardly. The extensions are connected to the opposed surfaces of the elements so as to prevent mechanical bending stresses peripherally of the diaphragm from being transferred to the electrostrictive elements. A water bladder assembly is placed within the driving ring and includes a water bladder in the space, the water bladder has water inlet means in communication with the exterior of the transducer; the transducer has a closeable gas inlet means for filling the space with a compressed gas at a predetermined pressure to collapse the water bladder. The water bladder is expandable from the collapsed condition to a condition substantially filling the space, thereby to protect the diaphragms against collapse under excessive ambient water pressure. A pair of semirigid supports are positioned in the space between the bladder and the diaphragms such that, at a predetermined operating depth, when the outside water pressure exceeds the internal gas pressure, the bladder expands and is supported by supports such that the water bladder is prevented from touching the diaphragms thus impeding the operation of the transducer, and hence extending the operating depth range.

In the preferred embodiment the water bladder assembly is attached within the driving ring in a manner in which the assembly is mechanically decoupled from the driving ring. The assembly includes a water bladder formed in the shape of a flattened torus; the water bladder has a water inlet means in communication with the exterior of the transducer; the transducer has a gas inlet means for filling the space with a compressed gas at a predetermined pressure to collapse the water bladder. The water bladder is expandable from a collapsed condition to a condition substantially filling the space, thereby to protect the diaphragms against collapse under excessive ambient pressures. The water bladder assembly also includes a pair of semirigid supports positioned in the space between the bladder and the diaphragms. The supports substantially enclose the torus-shaped water bladder when the latter is substantially filled with water such that, down to a predetermined operating depth, when the outside water pressure exceeds the internal gas pressure, the bladder expands and is supported by the supports such that the water bladder is prevented from touching the diaphragms thus impeding the operation of the transducer, and hence extending the operating depth.

The invention will be described with reference to the accompanying drawings in which:

FIG. 6 shows the water inlet port and the internal bladder in its neutral or just-filled shape;

FIG. 7 shows a detailed view of the air inlet port of the transducer; and

FIG. 8 shows a detailed view at a point where the bladder assembly is attached to the ceramic ring.

DESCRIPTION OF THE PREFERRED EMBODIMENT

A transducer according to this invention includes the combination of electrostrictive elements with spacer elements arranged as a driving ring. Within that ring is a space which houses a water bladder assembly. A pair of flexible diaphragms are mounted on the driving ring.

Figure 1:
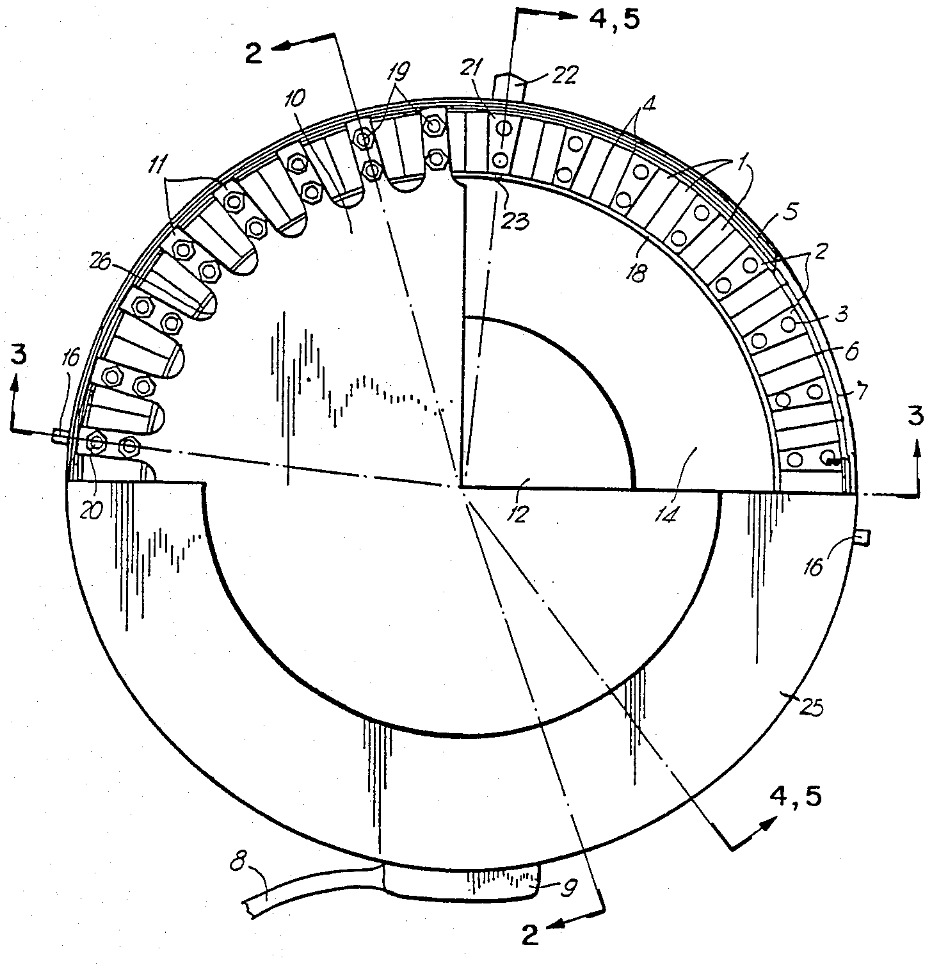
FIG. 1 is a plan view of the transducer with a cut-away portion showing the sealant around the periphery removed and a further cut-away portion showing the diaphragm removed.

More specifically, FIG. 1 shows a transducer having tangentially-poled piezoelectric ceramic elements 1 arranged in a ring. The ceramic elements may be formed typically from lead zirconate titanate. Between each pair of ceramic elements 1 is located a spacer element 2 formed of metal such as steel. The ceramic elements 1 and spacer elements 2 are bonded together with a thin adhesive layer 4 between adjacent elements to form the driving ring. A space is thus formed radially inwardly of this ring, as will be seen in FIGS. 2–5. The ceramic elements 1 are positioned side by side in pairs and are electrically connected in parallel. A "high" electrode 6 is located between the elements 1 of each pair and projects radially outwardly thereof. All of the electrodes 6 are connected by a conductor 7 extending around the periphery of the transducer. Conductor 7 is effectively spaced from the radially outward faces of elements 1. The other electrical connection to the ceramic elements 1 is provided by the spacer elements 2 functioning as the connections to the "low" electrodes. Electrical connection between all the spacer elements 2 is provided by the metal diaphragms of the transducer, as will be seen below. The electrical supply to the high and low electrodes is provided by a cable 8 connected to the transducer by a boss 9.

The driving ring assembly is given a compressive bias by an outer wrapping of fiberglass 5 applied under tension and consolidated with epoxy resin. This coating also encloses the conductor 7 as shown in the cut-away of FIG. 1. Diaphragms 10 cover the top and bottom surfaces of the ring, each diaphragm being formed of a stiff strong material such as steel, aluminum, or fiber reinforced plastic. Each diaphragm 10 is provided with a number of flat radial extensions 11 matching the positioning and number of spacer elements 2 in the ring. This configuration prevents mechanical bending stresses peripherally of the diaphragm from being transferred to the ceramic elements. Corresponding holes are provided in the radial extensions 11 and the spacers 2 so that the diaphragms 10 may be attached to the ring by steel bolts 19. The spacer elements 2 are made of slightly greater depth axially of the ring than the ceramic elements 1 so that the radial extensions 11 of the diaphragm do not come into contact with the ceramic elements.

Figure 2:
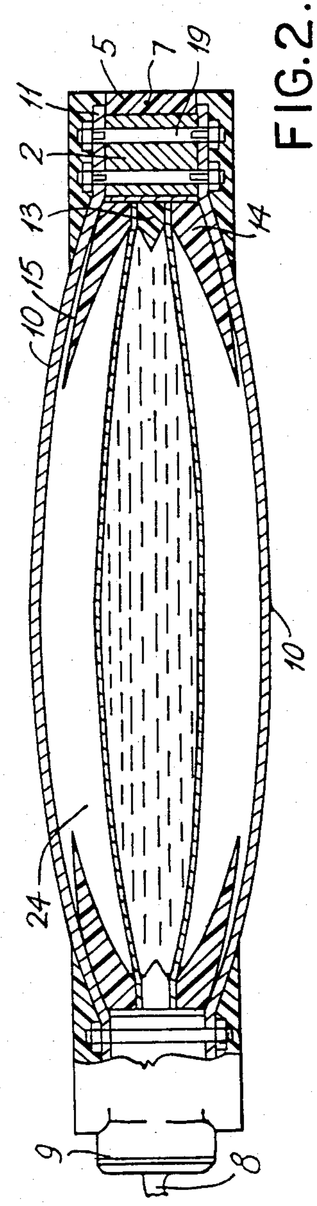
FIG. 2 is a view in radial cross-section of the transducer of FIG. 1 taken through a spacer element at the right-hand side and showing the water bladder partly filled.
Figure 3:
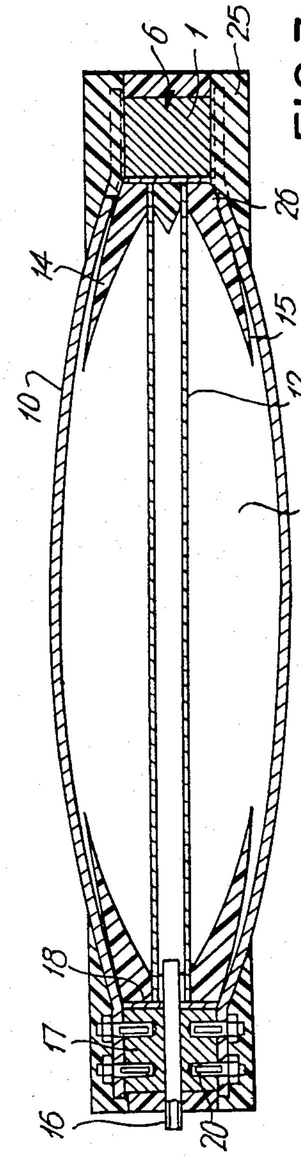
FIG. 3 is a view in radial cross-section taken at the left-hand side through a water inlet port in one of the spacer elements, and at the right-hand side through an electrode between adjacent ceramic elements.

A water bladder assembly is provided within said driving ring and consists of a water bladder 12 positioned in the space 24 formed radially inwardly of the ring. The water bladder 12 is made from two sheets of neoprene rubber each of which is bonded between a plastic center ring 13 and one of two supports 14 as shown in FIG. 2. The supports 14 are formed from a semirigid plastic so as to leave a small gap 15 between the diaphragms 10 and the supports 14. A water inlet tube 16 is passed through a particular spacer element 17 and through the centre ring 13 as shown in FIG. 3. Spacer element 17 is fitted with studs 20 instead of bolts 19 used in the other spacer elements 2. A small gap 18 is provided, extending peripherally between the edge of the bladder assembly and the ceramic ring.

Figure 4:
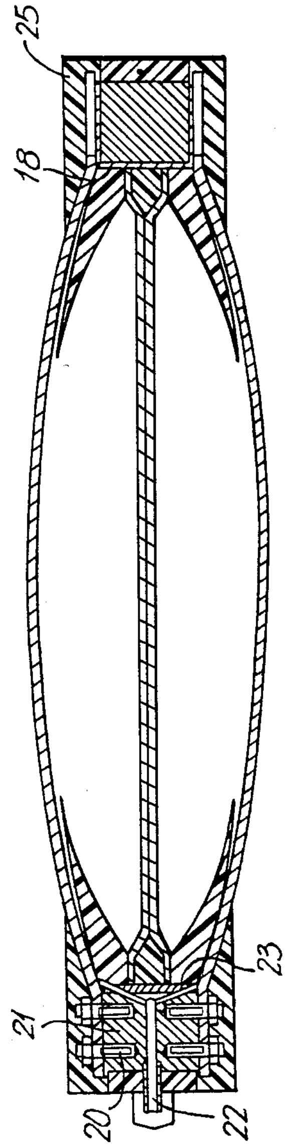
FIG. 4 is a view in radial cross-section taken at the left-hand side through a compressed air valve in one of the spacer sections, and on the right-hand side along the edge of the diaphragm radial extension showing the water bladder empty and compressed by injected air.

In FIG. 4, another particular spacer element shown at 21, is also fitted with studs 20 to provide a closeable compressed gas inlet 22 which connects via tubes 23 to the space 24 between the bladder 12 and the diaphragms 10. The final assembly is potted around the outer edge with a semirigid plastic 25 such as polyurethane, care being taken to seal the edges 26 of the diaphragms 10 so that the potting plastic does not flow into the gap 15. The potting plastic completely fills the gap 18 between the bladder assembly and the ring. Exposed metal parts which may be subject to corrosion are protected by painting or cathodic protection.

Figure 5:
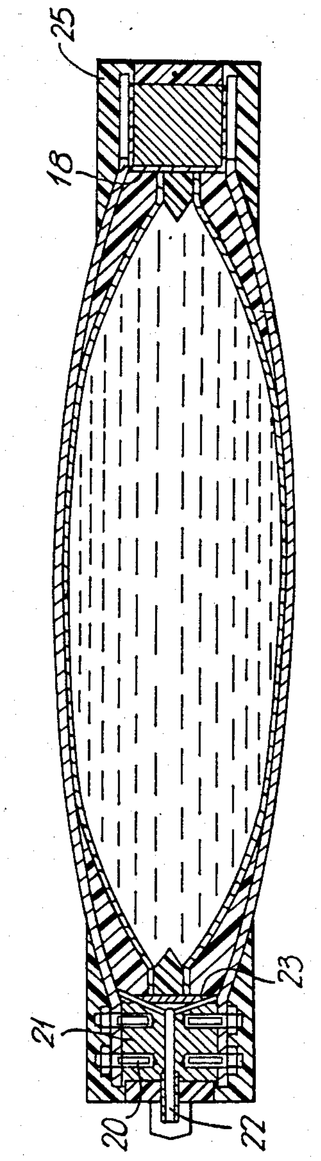
FIG. 5 is a view similar to that of FIG. 4, showing the water bladder as it would be at excessive depth.

In operation the space 24 is completely filled with one to four atmospheres of a compressed gas, preferably air, collapsing the water bladder 12 to the condition shown in FIG. 4. When the external water pressure exceeds the internal gas pressure, the bladder 12 expands and is supported by the supports 14 such that the water bladder is prevented from touching the diaphragms 10 thus impeding the operation of the transducer, and hence extending the operating depth range. If the maximum operating depth is exceeded, the water bladder expands to deform the supports 14, providing support over most of the diaphragm area to protect the transducer from destruction by the high external pressure as shown in FIG. 5.

Because of the high voltages required to drive a piezoceramic transducer, care must be taken to ensure that all insulating materials, particularly the potting plastic 25 and the wrapping 5, are of adequate electrical breakdown strength even after prolonged immersion in water. The radial extensions on the diaphgrams reduce the likelihood of breakdown by providing a longer insulating path from the "high" electrodes to the other metal parts.

Figure 6:
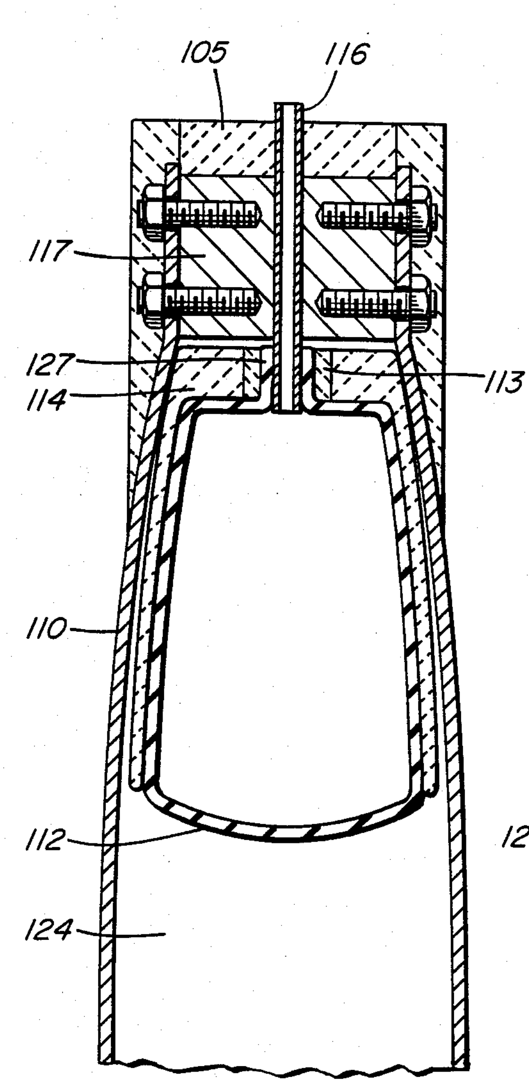
FIGS. 6, 7 and 8 show cross-sectional views of another embodiment of this invention in which the transducer has a toroidal-shaped rubber bladder.
Figure 8:
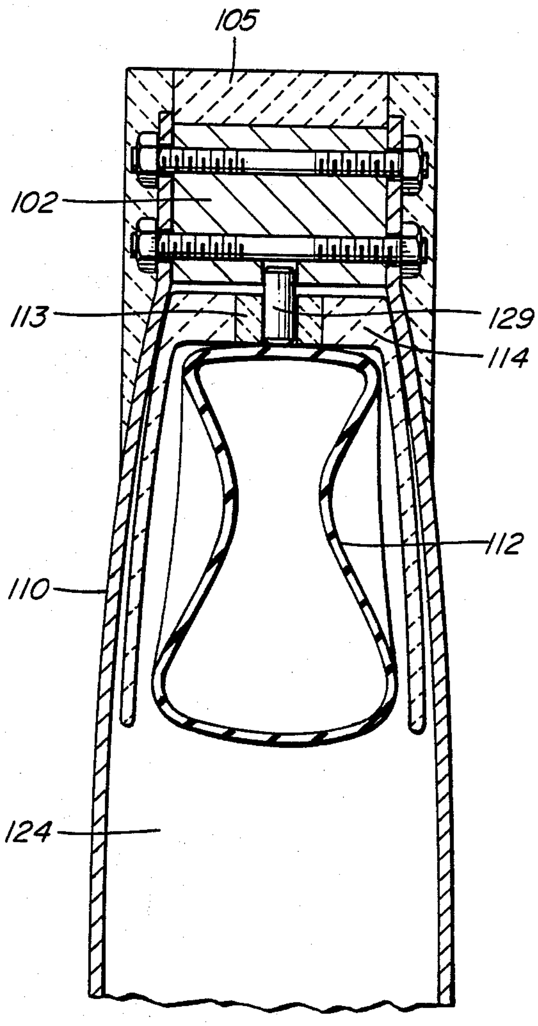

Referring to FIG. 6, the bladder assembly is attached to the driving ring in a manner in which the assembly is mechanically decoupled from said driving ring. The bladder assembly comprises a toroidal-shaped rubber bladder 112, an optional plastic center ring 113, and two fiberglass reinforced plastic (FRP) supports 114. The bladder 112 is expandable to the shape of a torus and further takes the shape of the inside of the FRP supports 114 so that the bladder 112 cannot touch the central portion of either diaphragm 110 when only partially filled with water, as shown in FIG. 8. The shape of the bladder 112 allows for an increase in the internal volume available for a compressed gas, thereby reducing the stiffening effect of the gas and increasing the operating depth range. The bladder 112 is supported between the two fiberglass supports 114 which are strong enough to support the weight of the water in the bladder without deflecting significantly. The ring 113, and supports 114 are bonded and/or bolted together. However, for clarity, no bolts are shown in the figures. One or more water inlets 116 are in communication with the exterior of the transducer to enable water to enter said bladder. The water inlets are sealed into the bladder 112 via nipples 127, which are molded as part of the rubber bladder. The water inlet 116 is also bonded and sealed to a particular metal spacer element 117 and the fiberglass wrapping 105.

In FIG. 6, the bladder 112 is shown fully inflated; a condition occurring at the maximum operating depth. Immersion to a depth greater than the maximum operating depth exposes the bladder 112 to an external water pressure greater than the internal gas pressure with the result that the bladder 112 expands to substantially fill the space 124 between the two diaphragms 110 and will tend to further compress the internal gas and deform the FRP supports 114, so that they are forced against the metal diaphragms. This protects the diaphragms 110 against collapse due to excessive external water pressure.

Figure 7:
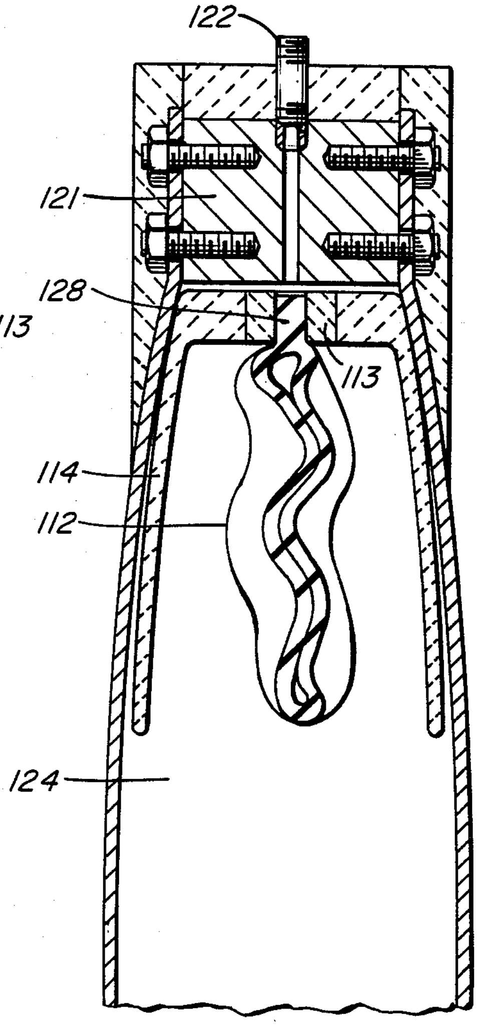

FIG. 7 shows a cross-sectional view of the transducer at a closeable gas inlet 122 used to prefill the internal space 124 of the transducer to a predetermined pressure. The bladder 112 is shown fully deflated as it might appear after the space 124 is prefilled with a compressed gas. Also shown is one of the several projections 128, which are molded as part of the rubber bladder 112, and which serve to secure the bladder within the bladder assembly. In this embodiment the bladder is secured to the center ring 113. The projections 128 are themselves bonded into holes in the center ring 113 using a suitable adhesive. The center ring 113 is an optional part of the water bladder assembly as the water bladder 112 could also be secured at the projections 128 to the two supports 114 which would be configured to form, once bonded together, holes to match the projections 128 of the bladder 112.

FIG. 8 shows a cross-sectional view of the transducer with the bladder 112 only partially filled with water.

The water bladder assembly is supported in a central position within the driving ring at a number of support points, shown at 129 in FIG. 8. In the embodiment of FIG. 8 a support peg 129 is threaded at one end into a spacer element 102 and at the other end the peg is made to be slideable in a hole in the center ring 113. Hence, the water bladder assembly is free to move radially within the space 124 relative to the driving ring. The above represents only one embodiment of a number of possible attachment methods. The peg 129, for example, can alternatively be threaded at the center ring 113 and made slideable in the spacer element 121. The support means can also consist of an elastic support or a spring or other connecting means functioning so as to mechanically decouple the water bladder assembly from said driving ring, thereby preventing high stresses between the bladder assembly and the ring. Such stresses would result from differential thermal strains and dynamic vibratory strains, if the bladder assembly and the ring were not decoupled.

All other elements of the transducers of FIGS. 6, 7 and 8 are the same as the elements described in FIGS. 1–5.

Thus, there has been described an improved underwater transducer of rugged construction in which there is more efficient electromechanical coupling from the ceramic ring to the diaphragms. The diaphragm flange stiffness is reduced by the method of attachment described herein using the radial extensions shown at 11 in FIG. 1, attached to the ceramic ring driving assembly. This increases the acoustic power output by increasing the electromechanical coupling of strain energy into the diaphragm.

Because bolts passing through the spacer elements attach the two diaphragms to the ring, the bending stresses at the diaphragm rim are not transferred to the ceramic elements, the weakest component in the transducer. Compensation for water pressure is provided, which also functions to protect the transducer against destruction at excessive depth. Ingress of water expands the bladder and compresses the internal air, supplying the necessary pressure compensation without seriously impeding the vibration of the diaphragms. A convex configuration of the diaphragms is used to provide a greater internal air volume and hence a greater operating depth range.

The embodiments of the invention in which an exclusive property or privilege is claimed are defined as follows:

1. A sealed underwater transducer comprising:

a plurality of electrostrictive elements and spacer elements arranged to form a driving ring, said elements having opposed surfaces axially of the ring, said ring surrounding a space radially internally of the same, said driving ring being expandable radially in response to an applied voltage;

a pair of flexible diaphragms closing off said space axially of said ring, said diaphragms each being formed with a plurality of extensions extending radially outwardly, said extensions being connected to said opposed surfaces of the elements so as to prevent mechanical bending stresses peripherally of the diaphragms from being transferred to the electrostrictive elements;

a closeable gas inlet means for injecting a compressed gas into said space;

a water bladder assembly within said driving ring, including a water bladder in said space, said water bladder having water inlet means in communication with the exterior of the transducer, said water bladder being collapsable by injection of a compressed gas at a predetermined pressure into said space via said gas inlet means, said water bladder being expandable from said collapsed condition to a condition substantially filling said space thereby to protect the diaphragms against collapse under excessive ambient water pressures; and a pair of supports positioned in said space between said bladder and said diaphragms such that at a predetermined operating depth, when the external water pressure exceeds the internal gas pressure the bladder expands and is supported by said supports such that said water bladder is prevented from touching the diaphragms thus impeding the operation of said transducer, and hence extending the operating depth range.

2. A sealed underwater transducer comprising:

a plurality of electrostrictive elements and spacer elements arranged to form a driving ring, said elements having opposed surfaces axially of the ring, said ring surrounding a space radially internally of the same, said driving ring being expandable radially in response to an applied voltage;

a pair of flexible diaphragms closing off said space axially of said ring, said diaphragms each being formed with a plurality of extensions extending radially outwardly, said extensions being connected to said opposed surfaces of the elements so as to prevent mechanical bending stresses peripherally of the diaphragm from being transferred to the electrostrictive elements;

a closeable gas inlet means for injecting a compressed gas into said space; and a water bladder assembly attached within said driving ring in a manner in which the assembly is mechanically decoupled from said driving ring, including a water bladder expandable to the shape of a torus, said water bladder having water inlet means in communication with the exterior of the transducer, said water bladder being collapsable by injection of a compressed gas at a predetermined pressure into said space via said gas inlet means, said water bladder being expandable from said collapsed condition to a condition substantially filling said space thereby to protect the diaphragms against collapse under excessive ambient water pressures, and a pair of supports positioned in said space between said bladder and said diaphragms, said supports substantially enclosing the torus shaped bladder when the latter is substantially filled with water, such that down to a predetermined operating depth, when the outside water pressure exceeds the internal gas pressure the bladder expands and is supported by said supports to prevent said water bladder from touching the diaphragms thus impeding the operation of said transducer, and hence extending the operating depth range.

3. A sealed underwater transducer as defined in claim 1 or 2 wherein the electrostrictive elements are arranged in pairs with a spacer element positioned between each pair.

4. A sealed underwater transducer as defined in claim 1 or 2 wherein a first electrode is provided between the electrostrictive elements of each pair and a second electrode provided by the spacer elements adjacent to said pair of electrostrictive elements.

5. A sealed underwater transducer as defined in claim 1 or 2 wherein each diaphragm is formed with a series of radial extensions for attachment to the opposed surfaces of said spacer elements.

6. A sealed underwater transducer as defined in claim 1 or 2 wherein the water bladder has a water inlet tube extending through one spacer element to enable water to enter said bladder.

7. A sealed underwater transducer as defined in claim 1 or 2 wherein the transducer has closeable gas inlet means extending through one spacer element to fill the space with the pressurized gas.

8. A sealed underwater transducer as defined in claim 1 wherein sealing means is provided around the exterior surface of said ring and along a junction between said diaphragms and said driving ring.

9. A sealed underwater transducer as defined in claim 8 wherein the sealing means consist of an outer wrapping of fiberglass applied under tension and consolidated with epoxy resin giving a compressive bias to the driving ring.

10. A sealed underwater transducer as defined in claim 2 wherein sealing means is provided around the exterior surface of said ring and along a junction between said diaphragms and said driving ring, said sealing means including an outer wrapping of fiberglass applied under tension and consolidated with epoxy resin giving a compressive bias to the driving ring.

11. A sealed underwater transducer as defined in claim 1 wherein the water bladder is made of two sheets of neoprene rubber bonded at their periphery and attached to said pair of supports.

12. A sealed underwater transducer as defined in claim 1 or 2 wherein the supports are thin annular rings made of fiberglass reinforced plastic.

13. A sealed underwater transducer as defined in claim 2 wherein the water bladder assembly is supported in a central position within said driving ring by connecting means so as to mechanically decouple the water bladder assembly from said driving ring. thereby preventing high stresses between the bladder assembly and the driving ring.

14. A sealed underwater transducer as defined in claim 2 wherein the water bladder is attached in said water bladder assembly by means of molded projections forming part of the water bladder and being bonded to said two supports of said assembly.

15. A sealed underwater transducer as defined in claim 1 or 2 wherein the diaphragms have a convex shape.

* * * * *